United States Patent
Jacobus

[15] 3,653,386
[45] Apr. 4, 1972

[54] PACIFIER AND SAFETY TEETHING RING ASSEMBLY

[72] Inventor: Rodman M. Jacobus, 67 Rosedale Road, Valley Stream, N.Y. 11581

[22] Filed: Feb. 11, 1970

[21] Appl. No.: 10,468

[52] U.S. Cl. .........................................................128/360
[51] Int. Cl. .....................................................A61j 17/00
[58] Field of Search ....................29/428, 453; 128/359, 360

[56] References Cited

FOREIGN PATENTS OR APPLICATIONS 818,243   10/1951   Germany...............................128/359
844,206   7/1952    Germany...............................128/360

Primary Examiner—Channing L. Pace
Attorney—Polachek & Saulsbury

[57] ABSTRACT

A pacifier and teething ring assembly includes a solid, endless ring handle, a fitting rotatably engaged on a section of the handle, a nipple on a stud extending from the block and a disc on the nipple. The length of stud and nipple, and the diameter of the disc both exceed the diameter of the inside opening of the ring handle so the fitting cannot be positioned inside the opening. The fitting has a cylindrical bore with lateral irregularly shaped slot to fit on the irregularly shaped section of the handle only by lateral movement of the fitting when inside the handle opening with nipple and disc detached. This arrangement prevents accidental removal of the fitting from the solid, endless ring handle.

6 Claims, 12 Drawing Figures

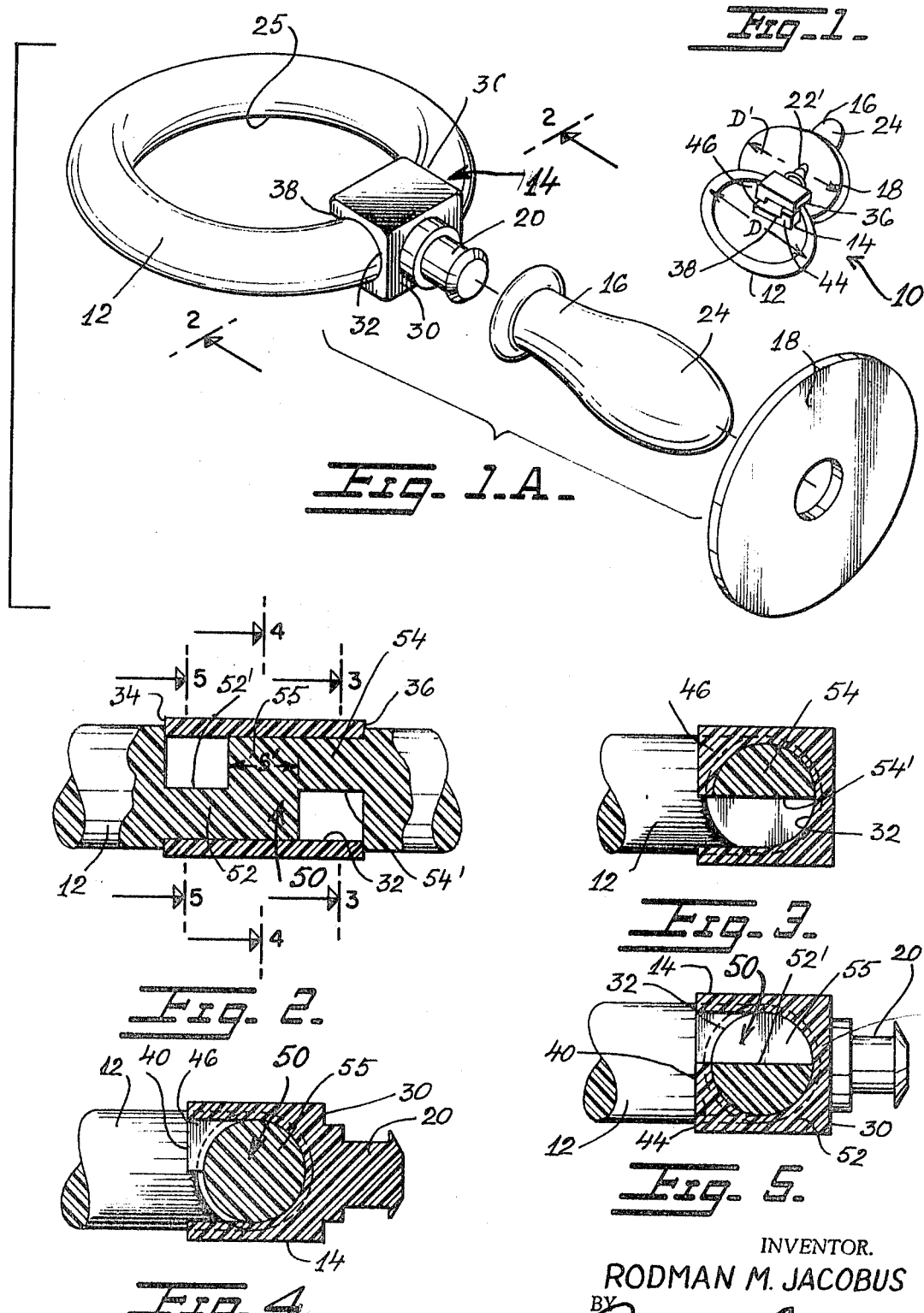

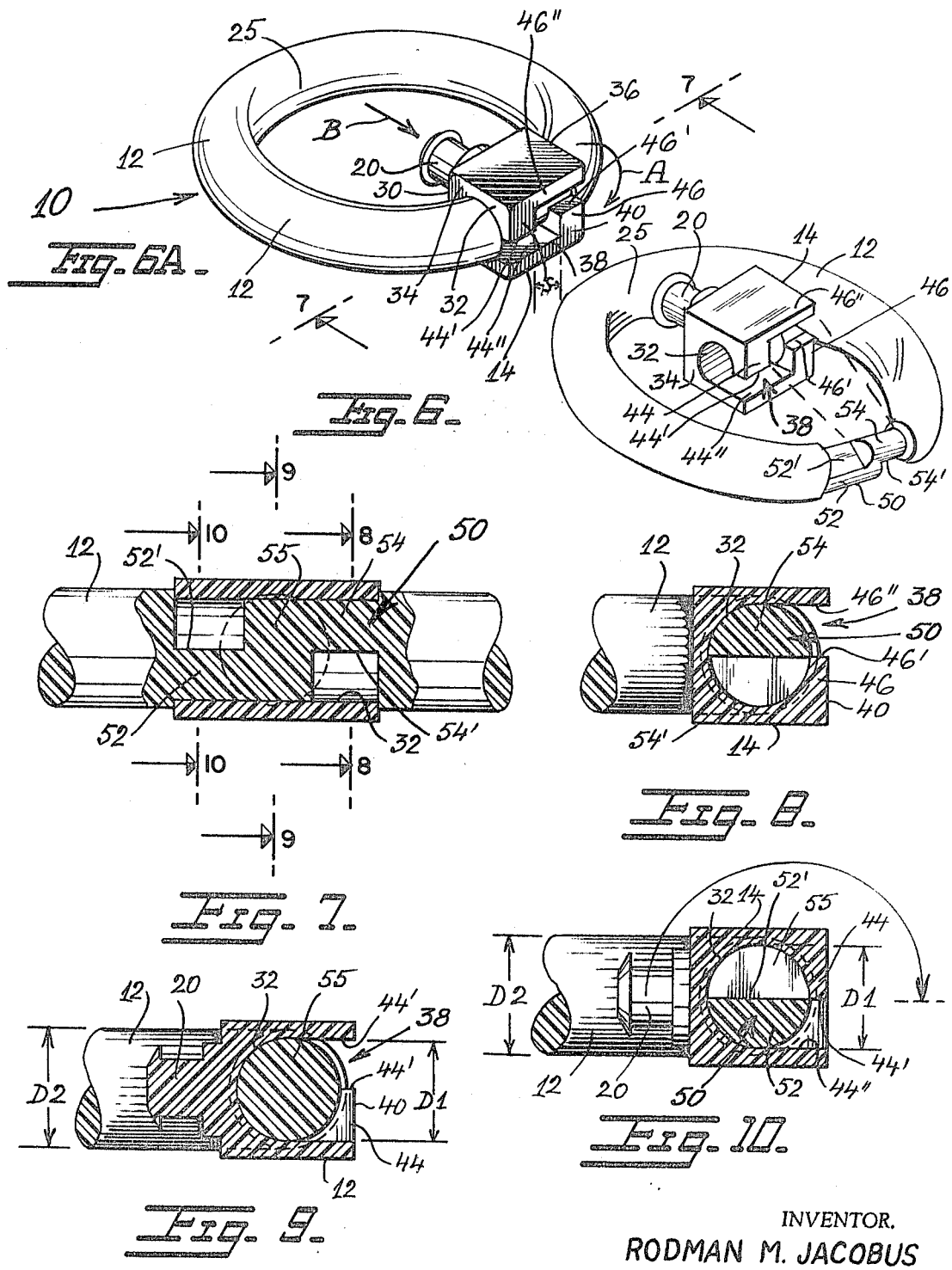

PACIFIER AND SAFETY TEETHING RING ASSEMBLY

The invention relates to the art of baby teething rings and pacifiers and more particularly concerns a teething ring assembly including an improved solid ring handle and nipple support.

Heretofore teething rings have generally consisted of a nipple and flat annular disc engaged on a small fitting rotatably mounted on a ring handle. The handle has a circular hole and is split radially to provide a radial opening into the hole. The edges of the handle adjacent to the radial opening are flexible so they can be twisted apart to permit engagement of the fitting thereon. Due to the flexibility of the handle, the fitting often comes off with the nipple and disc. The fitting can be pulled out of the nipple. The danger then arises that the baby may swallow the loose fitting. Many serious situations have arisen requiring emergency treatment because a baby has swallowed a fitting of such a disassembled teething ring assembly. Sometimes the ring handle is made of fragile plastic material and the fitting is forced on the split handle. This brittle handle often splits radially to release the rotatable fitting, which again, creates the safety hazard just described.

The present invention is directed at an improved pacifier and teething ring assembly which avoids the difficulties and disadvantages of prior pacifiers by providing a solid, endless ring handle. A fitting which cannot be swallowed by a baby, snaps on the handle in such a way that the fitting is freely rotatable and is not accidentally removable. A nipple engages on the fitting and a teething disc engages on the nipple. The diameter of the disc and the length of the nipple exceed the inside diameter of the ring handle so that the fitting cannot be turned to a position where the fitting would be removable.

The invention is explained in further detail in connection with the drawing, wherein:

FIG. 1 is a perspective view of a teething ring assembly embodying the invention.

FIG. 1A is an enlarged exploded perspective view of parts of the assembly, with fitting engaged in the ring handle.

FIG. 2 is a fragmentary, vertical, enlarged, sectional view taken on line 2—2 of FIG. 1A through the fitting and handle.

FIGS. 3, 4 and 5 are fragmentary cross-sectional views taken on lines 3—3, 4—4 and 5—5 respectively of FIG. 2.

FIG. 6 is an exploded perspective view of the ring handle and fitting prior to assembly.

FIG. 6A is a perspective view of the ring handle and fitting after assembly but prior to rotation of the fitting to the position shown in FIG. 1A.

FIG. 7 is an enlarged vertical sectional view similar to FIG. 2, but taken on lines 7—7 of FIG. 6A.

FIGS. 8, 9 and 10 are cross-sectional views taken on lines 8—8, 9—9 and 10—10 of FIG. 7.

Referring first to FIG. 1, the complete pacifier assembly 10 consists of a teething ring handle 12, rotatable plug or fitting 14, nipple 16 and disc 18. The fitting has a stud 20 upon which the open end of the nipple engages. The disc has a central hole 22 which receives the flexible nipple. The nipple has a bulbous end 24 which retains disc on the nipple FIG. 1A shows how the nipple engages on the nipple and the disc engages on the nipple.

The ring handle 12 is circular with a central circular opening 25. The diameter D of this opening is less than diameter D' of disc 18, as indicated in FIG. 1.

Rotation of the nipple, disc and fitting on the handle 12 is limited to about 300° because the disc and the nipple cannot pass through the opening 25 in the ring handle.

The fitting 14 can only be engaged on the ring handle when in a position inside the ring as indicated in FIG. 6. This position can only be assumed when the nipple and disc are removed from the fitting. The fitting 14 is a rectangular block. Stud 20 extends outwardly of front face 30. A cylindrical bore 32 is formed in the fitting and extends between opposite sides 34, 36. Diameter D1 of this bore is smaller than the cross-sectional diameter D2 of the ring handle; See FIGS. 9 and 10. A slot 38 is formed in the rear face 40 of the block. This slot communicates with bore 32. The slot has a rather rectangular S-shaped between sides 34, 36 as clearly shown in FIGS. 1, 6 and 6A. Portions 44 and 46 of the block extend in opposite directions from top and bottom faces 46, 48 respectively and are spaced apart a distance S at the center of the slot.

The ring handle is formed with cylindrical, recessed section 50 of reduced diameter. There are two spaced portions 52 and 54 which are semicylindrical in cross section as clearly shown in FIGS. 3,5,8. Central portion 55 is circular in cross section as clearly shown in FIGS. 4,5,9 and 10. The end portions 52 and 54 are spaced apart by the axial length S' of central portion 55 which is substantially equal to the spacing S between block portions 44, 46. The block portions 44, 46 have inner ends 44', 46' which are spaced from the adjacent sides 44'', 46'', of the slot 38 by distances which are equal to the maximum cross-sectional thickness of each semicylindrical portion 52,54 of the ring handle. By the arrangement described, when fitting 14 is moved in direction B, block 44 slides over the upper face 52' of handle portion 52 while block portion 46 slides under the flat bottom face 54' of block portion 54 and center portion 55 enters space S between blocks portions 44 and 46; see FIG. 6.

FIG. 6A shows the fitting 14 engaged on the recessed section 50 of the ring handle with stud 20 extending radially inward of opening 25. The fitting can be freely rotated as indicated by arrow A to the position best shown in FIGS. 1, 1A and 5, where the nipple and disc can be attached. The fitting, nipple and disc can then be rotated on section 50 about 300°. The fitting cannot be turned to the inside position of FIGS. 6A and 7–10 because the disc cannot pass through the handle opening 25, and because the length of stud and nipple is longer than the diameter of opening 25. Since the fitting can only be removed from the ring handle when in this inside position, the assembly of fitting, nipple and disc cannot be removed from the ring handle. To remove the fitting it will be necessary first to remove the disc from the nipple and then to remove the nipple from stud 20. Thereafter the fitting will be turned to the inside position of FIG. 6A and pushed radially inward opposite to direction B. Such a sequence of operations cannot occur accidentally. Furthermore, the strong, solid ring cannot open transversely at section 50. This avoids the undesirable condition of prior teething ring handles which are transversely split at the very point where the joint should be strong and solid.

The present invention has the further advantage that the fitting 14 may be made too large to be swallowed by an infant. Thus further assurance is provided against accidental swallowing of parts of the teething ring assembly.

The ring handle, fitting and disc are preferably made of sterilizable, rigid plastic material, but they could be made entirely of other sterilizable materials such as stainless steel or some lightweight noncorrosive metal. The assembly can be manufactured at low cost by mass production, plastic molding machinery.

Although a single embodiment has been illustrated, it will be apparent that many variations are possible.

What is claimed is:

1. A pacifier assembly, comprising an endless solid teething ring having a central opening; and a fitting having a cylindrical bore, and a lateral slot at one side of the fitting offset from a diametrical plane of said bore and communicating radially with said bore, said slot being narrower than the thickness of the ring; said ring having a circumferential section of reduced thickness offset from the central plane of the ring and insertable laterally through said slot when the fitting is disposed inside said central opening to engage said section axially in said bore, whereby the fitting is rotatably engaged on the ring, and is non-removable from the ring when rotated out of said central opening.

2. A pacifier assembly as defined in claim 1, wherein said section and said bore are both smaller in cross-sectional area throughout their lengths than the cross section of the ring so that the fitting is retained at said section and is prevented from circumferential movement along the ring.

3. A pacifier assembly as defined in claims 1, wherein said fitting comprises a solid block, said slot extending inwardly from said one side of the fitting, said section having an irregular shape, said slot having a shape conforming to that of said section so that the fitting can be engaged on the ring and disengaged therefrom respectively only by sliding the fitting radially of the ring when inside said central opening while said section passes through said slot into and out of said bore.

4. A pacifier assembly as defined in claim 1, wherein said fitting has a stud extending outwardly of another side of the fitting for engaging a flexible nipple thereon.

5. A pacifier assembly as defined in claim 4, further comprising a flexible nipple engaged on the stud, and a disc engaged on the nipple, said ring having a central opening which is smaller in diameter than that of said disc so that the fitting, nipple and disc cannot be rotated into said opening in the ring to prevent removal of the fitting from the ring.

6. A pacifier assembly as defined in claim 4, further comprising a flexible nipple engaged on the stud and having such a length that the fitting cannot be completely rotated around the ring into said central opening to prevent removal of the fitting from the ring when the nipple is engaged on the stud.

* * * * *